United States Patent [19]

Inglis

[11] Patent Number: 4,652,381
[45] Date of Patent: Mar. 24, 1987

[54] BATTERY PLANT WASTE WATER TREATMENT PROCESS

[75] Inventor: James L. Inglis, Liberty, Mo.

[73] Assignee: Farmland Industries, Inc., Kansas City, Mo.

[21] Appl. No.: 757,351

[22] Filed: Jul. 22, 1985

[51] Int. Cl.[4] ............................................. C02F 1/52
[52] U.S. Cl. ................................... 210/724; 210/722; 210/726; 210/912; 423/35; 423/92
[58] Field of Search ............... 210/712, 713, 721, 722, 210/724, 726, 727, 912; 423/92, 35

[56] References Cited

U.S. PATENT DOCUMENTS

| | | | |
|---|---|---|---|
| 2,151,261 | 3/1939 | Bartlett | 210/726 |
| 3,617,559 | 11/1971 | Cywin | 210/722 |
| 3,931,007 | 1/1976 | Sugano et al. | 210/721 |
| 4,024,055 | 5/1977 | Blann | 210/712 |
| 4,336,236 | 6/1982 | Kolakowski et al. | 423/92 |
| 4,338,200 | 7/1982 | Zeijlstra | 423/92 |
| 4,341,636 | 7/1982 | Harder et al. | 210/669 |

FOREIGN PATENT DOCUMENTS 50-79169  6/1975  Japan ................................... 210/912

Primary Examiner—Peter Hruskoci
Attorney, Agent, or Firm—Schmidt, Johnson, Hovey, & Williams

[57] ABSTRACT

A process of treating industrial waste water contaminated with environmentally unacceptable amounts of sulfuric acid and heavy metals such as lead, copper or zinc is disclosed which permits lowering of the concentration of the contaminants to a level permitting discharge to the sewer. Waste water resulting from floor wash and spray washing of lead acid batteries prior to shipment from the manufacturing facility contains sufficient sulfuric acid to cause the pH to normally be at a level of about 2 along with heavy metal contaminants present in concentrations which require treatment for removal before the discharge water will meet EPA standards. The water to be treated is directed to a first reaction and settling vessel where calcium carbonate is added along with an oxidation medium such as air which also functions to stir the stored waste water. Sufficient calcium carbonate is added to bring the pH of the solution to a level of about 5 and at the same time react with the heavy metals present such as lead, copper or zinc. Calcium sulfate and respective heavy metal carbonates precipitate and settle to the bottom of the treatment zone where they may be readily removed. In a second treatment vessel, calcium hydroxide along with enough calcium carbonate to maintain an excess of carbonate ion are added to complete separation of the heavy metals. Final removal of precipitate from the solution is accomplished through a suitable filter.

3 Claims, 7 Drawing Figures

BATTERY PLANT WASTE WATER TREATMENT PROCESS

BACKGROUND OF THE INVENTION

1. Field of the Invention

This invention relates to a process for treating industrial waste water containing contaminants in the nature of sulfuric acid and heavy metals such as lead, copper and zinc, to lower the concentration of such contaminants to a level permitting discharge of the waste water to the sewer.

The process has particular utility in the treatment of waste water resulting from the washing of lead acid batteries and plant floors causing the water to contain residual quantities of sulfuric acid and metal constituents primarily made up of lead and copper.

Use of the process permits recycling of treated water back to the plant washing process thus lowering the overall operating costs of the battery plant. Water which is periodically discharged to the sewer has acid and metal levels far below those permitted in governmental regulations.

2. Description of the Prior Art

The assignee of this application has long operated a lead acid battery plant. During the manufacture of lead acid storage batteries, it has been conventional for some time to suspend the batteries from a conveyor line for passage through a water spray cleaning system. Water is sprayed onto the batteries to thoroughly clean the exterior surface of each battery. The spent water is collected through floor drains and directed to a storage area. Following washing of the battery cases, the batteries are generally dried with pressurized air. A large amount of waste water also comes from washing down the floors in the plant.

The waste water from the lead acid battery wash and plant floor washings cannot be reused in the manufacturing process in part because iron in the waste water is deleterious to battery life, and the high acidity and lead content preclude discharge direct to a sewer without subjecting the water to a treatment operation. In the past, the assignee hereof has employed a mixture of sodium hydroxide and sodium sulfide to remove lead from the waste water. Some recycling of the contaminated water was carried out, but build up of a sodium sulfate salt prevented effective use of the treatment on an ongoing basis. EPA regulations provide that only 0.15 lb. of lead and 0.76 lb. of copper may be found in the waste water per million pounds of lead used per month in order to permit discharge of the waste water into the sewer.

It has been suggested in "Development Document for Effluent Limitation Guidelines and Standards for the Battery Manufacturing Point Source Category", October 1982, EPA 440/1-82/067-b, U.S. Environmental Protection Agency, that sodium hydroxide be added to the waste water to be treated and the resulting $Pb(OH)_2$ allowed to settle for removal. $Pb(OH)_2$ has a minimum solubility point on its solubility curve at pH 9.5. Thus, the discharge to sewer should be 9 to 10 and never below 8. Below pH 8, the solubility of $Pb(OH)_2$ is such that meeting the discharge requirements would be very difficult.

The development document also describes a method of using soda ash ($Na_2CO_3$) and caustic soda (NaOH) to treat the waste when no recycling is required to give low lead concentration. In this procedure, the lead is precipitated as the carbonate at a pH above 7.

Hautala, et al. in Volume 11, Issue No. 1 at pages 243, et seq. (1977) of Water Research ("Calcium Carbonate in the Removal of Iron and Lead From Dilute Waste Water") indicate that calcium carbonate has been used in the treatment of acid mine waters and steel pickle liquors at pH levels of 8 or more. However, precipitation of ferric hydroxide is believed to interfere with settling of calcium sulfate and lead carbonate. The Hautala, et al. process does not provide a treated waste water which will satisfy current EPA sewer discharge regulations.

Hoak, et al. in Volume 37, Issue No. 6, Industrial and Engineering Chemistry, June 1945 at pages 553, et seq. ("Treatment of Spent Pickling Liquors with Limestone and Lime") describe a process of treating spent pickling liquor with limestone and lime. Quick lime (CaO) was used to elevate the pH to the alkaline side before air was added to achieve rapid oxidation.

SUMMARY OF THE INVENTION

Waste water resulting from washing the exterior surfaces of lead acid batteries and from washing the plant floor is stored and when a suitable quantity thereof is collected, it is directed into a combination reaction and settling vessel wherein calcium carbonate is metered into the waste water to maintain a pH of about 5. Air is introduced into the waste water in the reaction vessel for the dual purpose of agitating the solution and assuring intimate admixture of the calcium carbonate and water solution, and to oxidize iron present in the waste water to ferric oxide precipitate. Calcium sulfate and lead, copper, zinc and other heavy metal carbonates thus formed settle out upon standing of the solution and may be removed from the treatment vessel.

The liquid is directed to a suitable hold tank and then introduced into a final treatment vessel where the solution is mechanically agitated and a slurry of about 12% by weight of mixed limes (20% calcium carbonate and 80% calcium hydroxide) is added. Again, precipitates are allowed to settle out with the clarified solution being directed overhead and then passed through a sand filter to effect final removal of a remaining solids from the water, which is then in condition for recycling to the plant wash water system.

DETAILED DESCRIPTION OF THE PREFERRED EMBODIMENT

Figure 1:
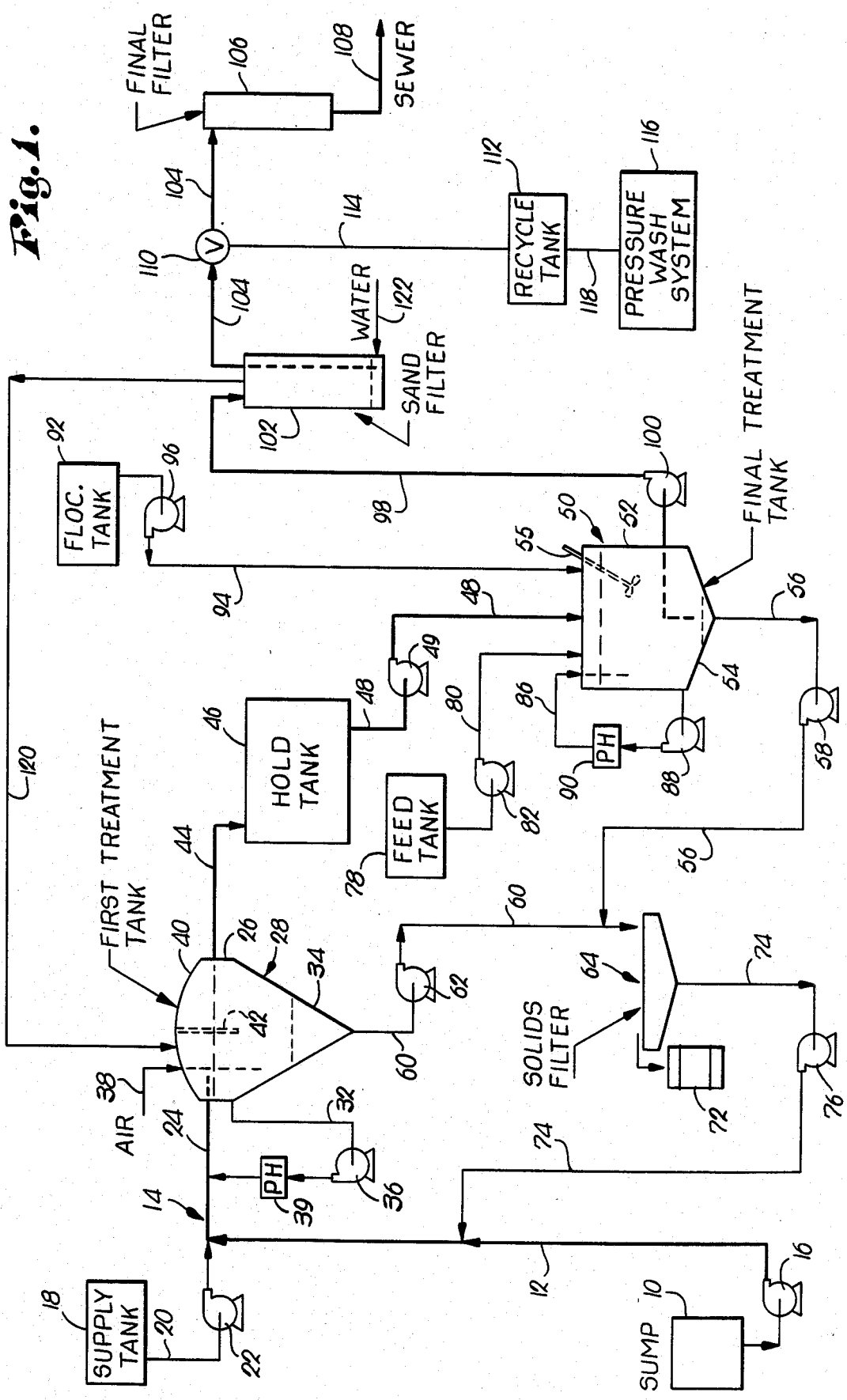
FIG. 1 is a schematic diagram of a preferred process for carrying out the invention hereof and illustrates in diagrammatic form various pieces of equipment which may be advantageously employed to practice the process.

In a typical lead acid battery plant which has a total lead input of approximately 1,000,000 pounds per month, current EPA regulations limit the waste water discharge to sewer contaminants to 0.15 lb. of lead and 0.76 lb. copper per month. If 50,000 lbs. of lead per day is consumed, the daily limit of lead and copper in waste water to sewer would be no more than 0.016 lb. of lead and 0.072 lb. of copper. Current EPA regulations are generally based on the total amount of contaminants discharged over a selected period of time and not their concentration in the waste stream. Compliance is determined by measuring the concentrations of the metals in the waste stream and multiplying it by the waste stream volume. New regulations thereby encourage the reduction of waste stream volumes. With a lead concentration of 1.28 ppm in the waste stream, only 1,200 gallons of waste water could be discharged in a 24 hour period. However, at 0.2 ppm of lead in the waste water, 7,600 gallons of treated waste water could be discharged to the sewer in a 24 hour period.

The process of this invention produces a waste water discharge to sewer containing less than 0.2 ppm of lead and an even lesser amount of copper. This compares with prior processes which gave a soluble lead concentration in the waste water above 10 ppm and to a certain extent were erratic and unpredictable.

Metal contaminants are precipitated as carbonate and carbonate-hydroxide basic salts. The solids are separated by filtration and sent to a landfill. It is a feature of this process that precipitation of these salts is affected at a pH value lower than those indicated to be feasible in the prior art. Precipitation of lead, copper and zinc carbonate salts have been found to occur at a pH as low as 4.5 to 5.0. The carbonates thus precipitated at a pH below 7 are less soluble than lead, copper and zinc hydroxide which are precipitated at a pH above 7. As a result, the removal of lead, copper and zinc salts is more efficient using a carbonate system than is the case when reliance is placed on precipitation of the metals as hydroxides above pH 7, as in the processes of the prior art and particularly, the EPA referenced methods. It is also a feature of this process that trace amounts of iron are removed by sparging air into the treatment vessel to precipitate the iron as $Fe_2O_3$. Precipitation of the iron by oxidation with air may readily be accomplished without adversely affecting removal of lead, copper and zinc as carbonates in an acidic medium. Furthermore, removal of the iron as ferric oxide at this point in the process avoids formation of a gelatinous, difficulty filterable iron precipitate which takes place above pH 7 and that would clog a filter used to remove the precipitates.

Using a 1,000,000 pound per month lead utilization lead acid battery plant as a exemplary standard, the present method treats 1,200 gallons a day of waste water from the battery wash operation to be processed daily with 200 gallons being discharged to the sewer and 1,000 gallons being recycled for reuse.

Waste water collected from the lead acid battery plant wash lines is stored in sump 10 which has an outlet line 12 leading to common supply line 14. Pump 16 is interposed in line 12 adjacent sump 10. A calcium carbonate slurry tank 18 is joined to supply line 14 through the provision of a line 20 having a pump 22 therein.

Figure 6:
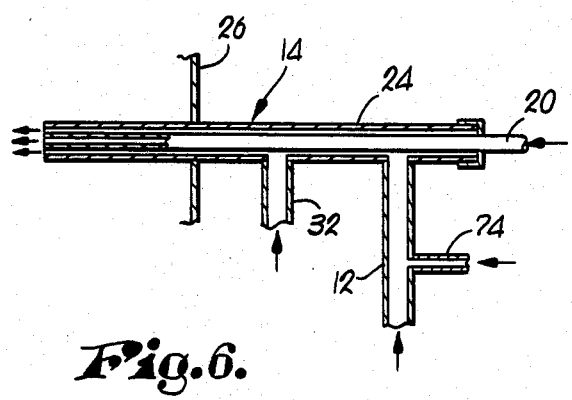
FIG. 6 is a depiction of suitable flow direction piping for the liquid streams introduced into the vessel of FIG. 2.

As is best seen in FIG. 6, supply line 14 includes an outer pipe 24 which extends through the cylindrical wall section 26 of generally conical first treatment tank 28. Line 12 is coupled directly to pipe 24 while pipe 20 extends into the interior of pipe 24 and is coaxial with the latter in spaced relationship from the interior wall of the latter to define a cylindrical passage around the periphery of pipe 20. Line 20 terminates within the interior of treatment tank 28 at the innermost extremity of pipe 24.

Figure 3:
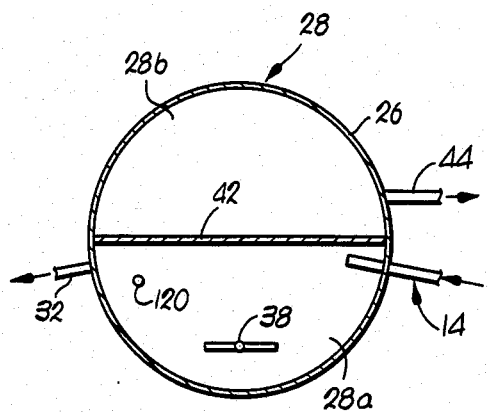
FIG. 3 is a horizontal cross-sectional view taken substantially along the line 3—3 of FIG. 2.
Figure 5:
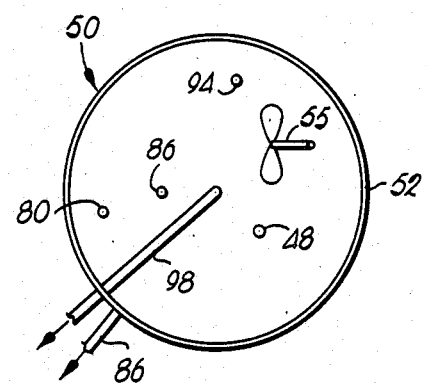
FIG. 5 is a horizontal view looking downwardly on the open top vessel of FIG. 4.
Figure 2:
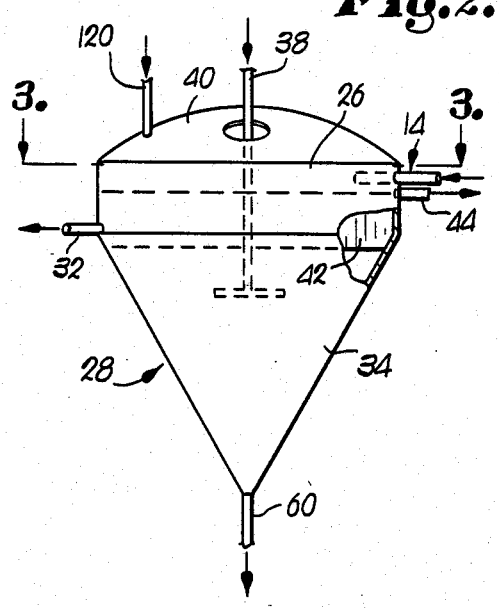
FIG. 2 is an enlarged fragmentary view of the first treatment tank on a somewhat enlarged scale illustrating the construction of a preferred vessel and the manner in which liquid and gas are caused to inflow and liquid is allowed to outflow therefrom.
Figure 4:
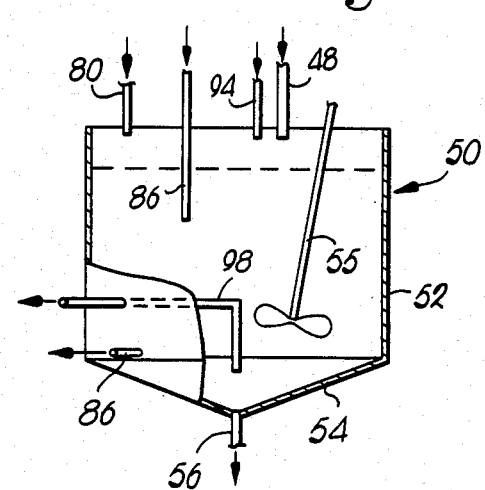
FIG. 4 is an enlarged fragmentary view of the final treatment tank again illustrating the construction of a preferred vessel and the manner in which liquid is caused to inflow and outflow therefrom.

A recycle line 32 connected to first treatment tank 28 at the zone of merger of cylindrical section 26 with the conical segment 34 of such tank has a pump 36 therein and leads to pipe 24 for communication with the latter between pipe 12 and the innermost end of pipe 24. A pH controller 39 in line 32 is connected with pump 22 to control delivery of calcium carbonate from supply tank 18 to first treatment tank 28. Line 38 extending downwardly into the spherical top section 40 of treatment tank 28 serves to introduce an oxidizing medium such as air into the body of liquid contained in tank 28. The lowermost end of air line 38 terminates in a tee having a series of openings in the horizontal portion thereof for delivery of air in bubble form into the interior of the tank 28. An upright baffle 42 (see FIGS. 1–3) within tank 28 and spanning cylindrical section 26 in bisecting relationship thereto is joined to the underside of spherical top section 40 and projects downwardly into the tank a distance somewhat below the lower circular line defined by the bottom of cylindrical section 26. Air line 38 extends into tank 28 through an open manhole on the same side of baffle 42 as supply line 14 (see FIGS. 2 and 3).

Line 44 joined to cylindrical section 26 of first treatment tank 28 and communicating with the interior thereof, leads to a holding tank 46. A feed line 48 joins the lower end of holding tank 46 with an open top final treatment tank broadly designated 50. A delivery pump 49 is interposed in feed line 48. The cylindrical sidewall 52 of tank 50 terminates at the lower peripheral edge thereof in a shallow coned bottom 54. Mechanical agitator 55 is provided in tank 50 for stirring the contents thereof. Line 56 communicating with the final treatment tank 50 at the bottom of conical section 54 and provided with a pump 58 therein leads to a solids removal line 60 connected to the lower conical section 34 of treatment tank 28. Line 60 has a pump 62 therein and terminates in direct overlying relationship to a solids filter broadly designated 64.

Figure 7:
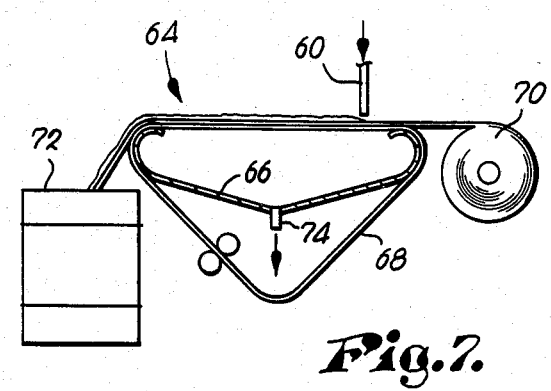
FIG. 7 is a schematic illustration of the solids filter used in association with the final treatment tank of FIG. 4.

As depicted schematically in FIG. 7, the solids filter 64 includes an underlying, angle bottom liquid collector 66 which receives an endless belt conveyor 68 which supports a disposable filter paper 70. Thus, solids deposited onto the filter paper supported by conveyor 68 are directed into the container 72 while liquid draining through the filter paper is returned to outlet line 12 via line 74 having a pump 76 therein.

Feed tank 78 for a slurry of calcium carbonate and calcium hydroxide has a delivery line 80 joined to the lower end thereof which feeds into the open upper end of final treatment tank 50. Pump 82 is interposed in line 80. Recycle line 86 extending from the tank 50 at the lower periphery of the cylindrical section 52 thereof loops back over the top of tank 50 and delivers recycle liquid into the open end thereof. A pump 88 is provided in line 86 while pH controller 90 is operably connected to pump 82 for controlling delivery of slurry from feed tank 78 into tank 50. Flocculant storage tank 92 has a delivery pipe 94 joined thereto which extends to the open top of tank 50 and is provided with a feed pump 96 therein.

An outlet line 98 having a pump 100 extends from the lower part of final treatment tank 50 to the inlet of an upright sand filter 102. An outlet line 104 extending from the lower end of filter 102 is joined to the inlet of a final filter 106 which has an outlet pipe 108 leading to the sewer. Valve 110 in line 104 permits selective direction of waste water into recycle storage tank 112 via line 114. Recycle tank 112 is in turn connected to the pressure wash system 116 via line 118. Filter purge line 120 joins the sand filter 102 to the top spherical section 40 of first treatment tank 28. Backwash water is supplied to the lower end of sand filter 102 by a fresh water supply line 122.

Operation of Preferred Embodiment

During the manufacture of lead acid batteries, it is conventional to wash the batteries prior to packaging. Generally speaking, the batteries are supported by a conveyor which transports the units through a spray wash where they are subjected to three separate high-pressure spray washes. The wash water removes residual lead and sulfuric acid whereupon the batteries are blown dry. Waste water collected from the washing operation is directed via floor drains to the sump 10 along with the water used to wash the plant floor for treatment to permit recycling thereof to the wash water systems, with a certain proportion allowed to flow into a sewer line. The waste water is intermittently pumped via line 12 into the first treatment tank 28 through supply line 14. The waste water from pump 10 is generally saturated with lead sulfate and often contains suspended $PbSO_4$. Total lead in the waste water can run as high was 500 ppm. In addition, the waste water collected in sump 10 typically contains about 1% $H_2SO_4$ giving the water a pH below 2. Iron is normally present at levels about 50 ppm while copper can be as high as 10 ppm. For a plant consuming about 1,000,000 lbs. of lead per month, the exemplary lead acid battery wash and floor wash systems will generate about 1,200 to 1,300 gallons per day of waste water collected in sump 10. The temperature of such water will be approximately the ambient temperature of the plant.

For a typical wash water system as described, treatment tank 28 should have a working capacity of approximately 1,300 gallons. Treatment of waste water in the tank 28 can be accomplished on a continuous or batch basis. Waste water collected in sump 10 is pumped to vessel 28 via line 12 until the treatment tank is substantially filled with the waste water to be treated. Thereafter, delivery of water to the treatment tank may be on an intermittent basis or substantially continuously, if the flow is controlled such that there is adequate residence time of the waste water in tank 28 to assure optimum precipitation of calcium sulfate and heavy metal carbonates which settle out of the solution and are removed from the tank via line 60. In order to assure collection of solids at the bottom of the tank 28, inclination of the conical wall 34 at an angle of about 30° has been found to produce satisfactory results. The divider baffle 42 desirably is of a depth such that it is connected to and extends from the spherical top 40 of the tank to a horizontal line about 4 inches below the circular, circumferentially extending lower margin of the cylindrical section 26 of tank 28, thus dividing the upper part of the treatment tank 28 into a treatment section 28a (i.e. the upper portion of the tank 28 into which the waste water is directed via line 14) and a settling section 28b (i.e. the upper portion of the tank 28 from which the liquid is allowed to egress from the tank through line 44; see FIG. 3).

Air is sparged continuously into the interior of treatment tank 28 through line 38 to effect some mixing of the liquid contained in the tank and to also provide an adequate supply of an oxidizing agent (in this case $O_2$) to convert the iron contained in the waste water to ferric oxide ($Fe_2O_3$). However, the major mixing of liquid in treatment tank 28 is provided by recirculation of liquid through line 32 by pump 36.

Calcium carbonate and recycled waste water are mixed in supply tank 18 and the slurry thus produced is pumped via line 20 into the interior of treatment tank 28 extending coaxially through pipe 24. Operation of pump 22 controlling delivery of calcium carbonate slurry from supply tank 18 to first treatment tank 28 is under the control of pH metering unit 39. Although the specific concentration of the calcium carbonate in supply tank 18 is not highly critical, a 12% by weight slurry of the calcium carbonate may readily be pumped into the interior of the vessel 28. A normal rate during operation of pump 22 has been found to be about 80 pounds of calcium carbonate per 1,000 gallons of waste water. The amount required may vary within relatively large limits and depends in large measure on how well sulfuric acid spills are controlled in the lead acid battery manufacturing facility. The main consideration is that the amount of calcium carbonate furnished to first treatment tank 28 and the period of delivery thereof to the treatment vessel be controlled such that the pH of the waste water contained in treatment tank 28 be maintained at a pH of from about 4.8 to 5. Thus, controller 39 should be set up such that it initiates operation of pump 22 to deliver calcium carbonate slurry to the interior of first treatment tank 28 when the pH of the recycle water flowing through pipe 32 reaches a level of about 4.8, and then functions to discontinue energization of pump 22 when the pH of the solution in the recycle line 32 rises to a level of about 5.0. The calcium carbonate reacts with sulfuric acid in the waste water to produce calcium sulfate which precipitates from the solution as $CaSO_4.2H_2O$. In addition, heavy metals present in the waste water such as lead, copper and zinc react with the calcium carbonate to form carbonate precipitates which, along with the calcium sulfate settle to the bottom of the tank 28 for removal via line 60. The majority of the carbonate however reacts with the sulfuric acid and is expelled as $CO_2$ gas.

From one to three times per day solids which have collected in the lower conical section 34 of tank 28 are removed via line 60 during operation of pump 62. The high solids content liquid delivered from line 60 is deposited on the filter paper 70 of filter 64 where such solids are directed by conveyor 68 into the container 72. For most efficient operation of the filter 64, the unit is preferably of the type causing a vacuum to be imposed on the conveyor belt 68 with removed water being directed via line 74 back to supply line 12 through the action of pump 76. Solids collected in container 72

(which for example may be a 55 gallon drum) are shipped to a landfill.

By virtue of the fact that the waste water in first treatment tank 28 is not only recirculated but also must flow beneath the lower edge of baffle 42 from reaction zone 28a to the quiescent zone 28b, there is efficient interreaction between the calcium carbonate and the sulfuric acid and heavy metals contained in the waste water. Liquid overflow from treatment tank 28 leaves the latter via line 44 and is directed into the hold tank 46 by gravity flow. The pH of the waste water leaving vessel 28 is in the order of 5 to 7 because the calcium carbonate continues to react in the static section 28b of treatment tank 28. The soluble lead, copper and zinc in the waste water leaving first treatment tank 28 have been found to be less than 0.2 ppm but the totals may be above 10 ppm because of fine particles that are entrained in the liquid. On the other hand, the soluble iron content has been determined to be less than about 0.5 ppm if oxidation has been properly carried out in the reaction zone 28a of tank 28. Desirably, hold tank 46 is of a size to hold about 1,500 gallons of solution where tank 28 has a capacity of 1,300 gallons (although an emergency overflow hold tank of an additional 1,500 gallons capacity may be provided in association with hold tank 46 if additional hold capacity is desired.

Preferably, the contents of the hold tank 46 are pumped once a day into the final treatment tank 50 via line 48. An approximate 12% by weight solids slurry of a mixture of 20% $CaCO_3$ and 80% $Ca(OH)_2$ (providing a mole ratio of carbonate to hydroxide of about 1:10) is mixed in feed tank 78 and pumped into final treatment tank 50 through line 80 under the control of pump 82. Again the 12% concentration of the calcium carbonate-calcium hydroxide mixture may readily be pumped through line 80 to the tank 50. The ratio of $CaCO_3$ to $Ca(OH)_2$ is such as to provide an excess of carbonate ions in final treatment tank 50. Calcium hydroxide is necessary to raise the pH to the desired level in the final treatment. Under normal operating conditions there is little, if any, reaction of calcium carbonate in the treatment tank 50. The solubility of lead hydroxide (2.1 ppm as lead) is too high to meet specifications; thus, steps are taken to preclude formation of lead hydroxide in the process. Typical usage of $Ca(OH)_2$ is no more than about 8 pounds per 1,000 gallons of waste water.

Mixing of the solution in treatment tank 50 is assured by a slow speed agitator in the nature of a propeller mixer 55. In addition, the solution in treatment tank 50 is recirculated through line 86 under control of pump 88. The pH controller 90 functionally coupled to pump 82 controls the operation of the latter to feed the $CaCO_3$—$Ca(OH)_2$ slurry into treatment tank 50 upon demand. The controller is adjusted between a pH of 8.0 and 9.0. When the pH of the solution reaches 9.0, operation of pump 82 is discontinued, whereupon the contents of treatment tank 50 are mixed for at least about ½ hour and then an anionic polyelectrolite flocculant contained in tank 92 is pumped via line 94 into the final treatment tank 50. A preferred flocculant giving desirable results has been found to be Mitfloc 51 supplied by Mitco Incorporated, Grand Rapids, Mich. After approximately 1 minute of mixing, the system is shut off and the contents of final treatment tank 50 are allowed to settle for from 2 to 24 hours and most preferably about 20 hours.

Heavy metal carbonates and any residual calcium sulfate collected in the bottom of final treatment tank 50 are returned to line 60 via line 56 under the control of pump 58 for filtering of such solids in association with those received from first treatment tank 28. The liquid is thereby returned to first treatment tank 28 through line 74, line 12 and supply line 14.

The clear supernatant resulting from quiescent settling of solids from the waste water in tank 50 is pumped via transfer line 98 under the control of pump 100 to sand filter 102 to remove suspended particles in the waste water. Backwashing of the sand filter 102 should be carried out about once a week with water being supplied for this purpose through line 22 and the resulting solids removed being directed back into first treatment tank 28 through line 120.

The discharge from sand filter 102 is directed via line 104 to a three way valve 110 with one line 104 therefrom going to the final filter 106 while another line 114 returns water to the recycle tank 112 which is connected to the pressure wash system 116 through line 118. The waste water treated each day is divided such that about an average of 80% thereof is returned to the pressure wash system 116 while the remaining 20% goes to the final filter 106 for ultimate discharge to the sewer via line 108. The treated waste water leaving final filter 106 is normally well within regulations established by the EPA. However, final filter 106 desirably containing a 5 micron bag filter is a safety measure if a malfunction of sand filter 102 occurs for some reason, or if some particularly fine material is not removed by settling in the final treatment tank and passed through filter 102. In a preferred arrangement, recycle tank 112 is of dimensions holding approximately 4 days of water for supply to the plant pressure wash system 116.

Oxidation of iron contained in the waste water while the latter is held in tank 28 prevents formation of a hard to filter iron precipitate in the final treatment tank 50. If unoxidized iron is allowed to reach tank 50, filtration problems can occur above pH 7 (noting in this respect that the pH of the waste water in tank 50 is desirably at least about 8 up to about 9), $Fe(OH)_3$ which forms can be very difficult to filter. Air sparging of the waste water in the first treatment tank 28 not only permits utilization of the air as an agitation medium, but also assures conversion of the iron to $Fe_2O_3$ which precipitates and may be readily filtered out in the filter 64.

A particularly important feature of the present process is the fact that a relatively inexpensive commodity of commerce (limestone, i.e. calcium carbonate) may be employed to effect removal of sulfuric acid and heavy metals from the battery acid plant waste water. Limestone not only may be obtained at a reasonable cost but is available in a particle size that assures efficient reaction thereof with the acid and heavy metals in the waste water. Typically, calcium carbonate sold as paint pigment or an animal feed additive has a particle size of approximately 5 microns. Desirably, the calcium carbonate is of a particle size such that at least about 90% will pass through a 100 mesh screen.

In spite of the low solubility of $CaCO_3$ in water, the present process takes advantage of the fact that calcium carbonate becomes more soluble in a solution saturated with $CO_2$. Since the reaction of $H_2SO_4$ with $CaCO_3$ results in release of $CO_2$ thus saturating with the solution of carbon dioxide, the carbonate ion is present in sufficient supply to assure precipitation of lead and other heavy metals as carbonates. It was therefore unexpectedly found, contrary to the teachings of the prior art as for example, indicated in the above-referenced EPA Development Document, that effective removal of lead and other heavy metals may be accomplished at a pH in the order of 5.

Although best results are obtained at the lead cost using limestone ($CaCO_3$) as the precipitating agent for the sulfuric acid and heavy metals in the waste water, other alkali metal and alkaline earth carbonates may be employed. Suitable reactants in this respect would include lithium carbonate, sodium carbonate, potassium carbonate, magnesium carbonate, and barium carbonate.

In the second treatment tank 50, wherein calcium hydroxide in association with calcium carbonate is added to the waste water, $Ca(OH)_2$ is the additive of choice for cost reasons but again other alkali metal and alkaline earth hydroxides would be usable such as lithium hydroxide, sodium hydroxide, potassium hydroxide, and barium hydroxide. Use of salts that form soluble metal sulfates will cause a buildup of that metal salt in the water thus precluding recycling of the treated waste water even though lead, copper and zinc are removed to desirable sewr discharge levels.

Results obtained from practicing the process of this invention on an actual plant basis may be summarized as follows (21 days actual plant operation):

| Day | Lot No. | Gals. To Sewer | pH | Copper PPM | Copper Lbs. To Sewer | Lead PPM | Lead Lbs. To Sewer |
|---|---|---|---|---|---|---|---|
| 1 | 1003 |  | 8.37 | 0.10 |  | 0.12 |  |
| 2 | 101R |  | 7.89 | 0.16 |  | <0.10 |  |
| 3 | 102R |  | 8.07 | 0.13 |  | 0.14 |  |
| 4 | 103S | 130 | 8.12 | 0.17 | 0.00018 | 0.10 | 0.00011 |
| 5 | 105R |  | 9.16 | 0.21 |  | 0.37 |  |
| 6 | 106S | 910 | 10.62 | 0.07 | 0.00053 | <0.10 | 0.00076 |
| 7 | 107R |  | 9.02 | 0.05 |  | <0.10 |  |
| 8 | 108R |  | 7.25 | 0.12 |  | <0.10 |  |
| 9 | 109S | 270 | 9.38 | 0.10 | 0.00023 | <0.10 | 0.00023 |
| 10 | 110S | 210 | 7.30 | 0.16 | 0.00028 | <0.10 | 0.00018 |
| 11 | 111R |  | 9.44 | 0.14 |  | <0.10 |  |
| 12 | 112S | 730 | 6.51 | 0.12 | 0.00073 | 0.19 | 0.00116 |
| 13 | 113R |  | 6.93 | 0.06 |  | 0.14 |  |
| 14 | 114R |  | 6.98 | 0.05 |  | <0.10 |  |
| 15 | 115R |  | 7.11 | 0.08 |  | 0.19 |  |
| 16 | 116R |  | 7.05 | 0.02 |  | <0.10 |  |
| 17 | 117S | 240 | 8.42 | 0.02 | 0.00004 | <0.10 | 0.00020 |
| 18 | 118S | 310 | 7.13 | 0.03 | 0.00008 | <0.10 | 0.00026 |
| 19 | 119S | 30 | 7.31 | 0.03 | 0.00001 | <0.10 | 0.00003 |
| 20 | 120S | 80 | 8.01 | 0.03 | 0.00002 | <0.10 | 0.00007 |
| TOTAL |  | 2910 |  |  | 0.00210 |  | 0.00298 |

This Period:
Lead Consumed: 725,384 lbs.
Days Production: 21

EPA Allowable Discharge:

| Copper | Lead |
|---|---|
| 0.04974 lbs/day | 0.01105 lbs/day |
| 0.55129 lbs/period | 0.10881 lbs/period |

| EPA Discharge Limits (Lbs. Per Million Lbs. of Lead Consumed): | | |
|---|---|---|
|  | Copper | Lead |
| Daily | 1.44 | 0.32 |
| Monthly | 0.76 | 0.15 |

I claim:

1. In a method of treating industrial waste water from a lead acid battery manufacturing plant contaminated with environmentally unacceptable amounts of sulfuric acid along with lead and copper to lower the concentration thereof to levels permitting discharge of the water to a sewer, the improved steps of:

adding an amount of an alkaline earth carbonate selected from the group consisting of calcium, magnesium and barium carbonate and mixtures thereof to the waste water to initially raise the pH thereof to a level which is especially conducive to precipitation of lead and copper carbonate and formation of an alkaline earth sulfate from the sulfuric acid, the amount of alkaline earth carbonate added to the waste water being sufficient to raise the pH of the waste water to a level of about 4 to about 5 to effect formation of an adequate quantity of alkaline earth sulfate and precipitation of lead and copper carbonate such that upon removal of the precipitates, waste water may be discharged to the sewer which meets environmental restrictions imposed on the discharge;

a mixture of alkaline earth carbonate and alkaline earth hydroxide is added during the second addition and removing lead and copper carbonate precipitates from the waste water prior to discharging the latter to the sewer.

2. In a method of treating industrial waste water as set forth in claim 1, wherein adjusting the pH of the waste water following the addition of the alkaline earth carbonate thereto, to a level above about 7 by addition of an alkaline earth hydroxide before effecting removal of precipitates from the waste water thereby preventing the redissolution of suspended lead and copper carbonates; and the mole ratio of carbonate to hydroxide in the second addition to the waste water is about 1 to 10.

3. In a method of treating industrial waste water as set forth in claim 1, wherein the step of adjusting the pH of the waste water to a value above about 7 with an alkaline earth hydroxide is carried out in a manner to cause the waste water to have a pH of about 8 to 9 prior to discharge of the waste water to the sewer.

* * * * *